Nov. 5, 1940.  L. A. RINGELSTETTER  2,220,496

FLOWMETER

Filed June 30, 1939

INVENTOR.
Leo. A. Ringelstetter
BY Frank M. Slough
ATTORNEY.

UNITED STATES PATENT OFFICE 2,220,496

FLOWMETER

Leo A. Ringelstetter, Plain, Wis.

Application June 30, 1939, Serial No. 282,090

5 Claims. (Cl. 73—210)

My invention relates to flowmeters and relates more particularly to means for measuring and indicating the fluid consumption of internal combustion engines installed in vehicles operating upon land, upon water, or in air.

It is an object of my invention to effect accurate indication of rate of fluid flow, indicating the same in any desired manner.

Another object of my invention is to provide a device of the type described, wherein rapid variations in rate of flow are subdued in their effect upon the indication of rate of flow, in such manner as to give an integrated indication of rate of flow.

Another object of my invention is to provide a device of the type described, wherein pulsating flow of the fluid therethrough is registered at its average rate.

Another object of my invention is to prevent undue impedance of free flow of the fluid registered.

Another object of my invention is to provide a flowmeter adapted for controlling various types of apparatus, to a degree proportional to the rate of flow of any fluid flowing in any conduit of airplanes, and land and water vehicles.

Another object of my invention is to provide a flowmeter which is simple to install, inexpensive in manufacture, and efficient in use.

Other objects of my invention and the invention itself will become more readily apparent from the following description, in which description reference will be had to the accompanying drawing forming a part of this specification, and in which drawing.

Figure 1:
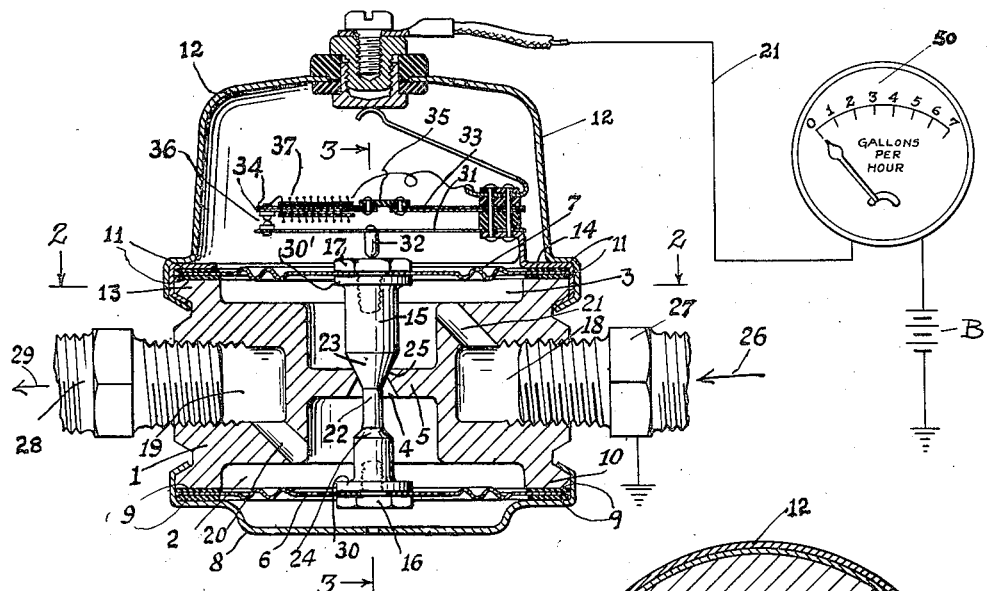
Fig. 1 is a front elevational view of the flowmeter in partial longitudinal medial section.
Figure 2:
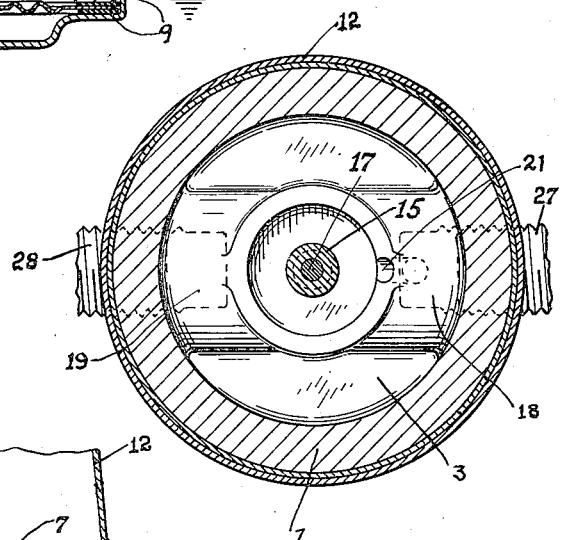
Fig. 2 is a view taken from the line 2—2 of Fig. 1.
Figure 3:
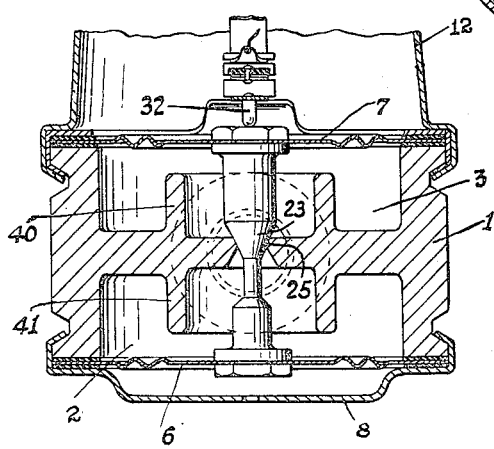
Fig. 3 is a view taken on the line 3—3 of Fig. 1.

Referring now to the figures of drawing, in all of which like parts are designated by like reference characters, at 1 I show a casing in the form of a casting, comprising two pressure compartments 2 and 3, said compartments adapted for variably restricted communication of fluid through an orifice 4 of a partition 5 between the two compartments.

At 6 and 7 I provide like flexible preferably metallic diaphragms, each forming a resiliently movable wall of a different one of the pressure compartments 2 and 3. Means comprising a closure cap 8 and gaskets 9 maintain the diaphragm 6 in sealed relation to and upon the rim flange 10 of the lower portion of the casting 1, to maintain the rim of the diaphragm 6 in fluid sealed engagement with the rim flange 10, whereby the diaphragm 6 becomes in effect a flexible outer wall of the pressure compartment 2.

Similarly, the uppermost diaphragm 7 is held in fluid-tight sealing engagement with the uppermost rim flange 13 of the casting 1 by means of a clamping ring 14 and interposed gaskets 11. A metering valve element 15 is rigidly secured by its ends to the central portions of the two diaphragms, and interconnects said diaphragms, ensuring that the central portions of both diaphragms will be deflected alike and in the same direction.

Although the metering valve element 15 may be secured at its ends to the central portions of the two diaphragms, in any suitable manner, I have illustrated these as being secured thereto by the provision of like cap screws 16 and 17 having their threaded ends projected through central apertures of the diaphragms and into threaded recesses of the metering element 15. Preferably thin gasket washers, shown but not designated by reference characters, are disposed between the clamping surfaces of the metering element and the cap screws.

The casting 1 is likewise provided with inlet and outlet ports, respectively shown at 18 and 19, communicating through ducts 21 and 20 respectively to the fluid pressure compartments 3 and 2. The metering element 15 preferably comprises an upper portion of sufficiently large diameter as to provide the frusto-conical surface 23 in a medial portion, said valve surface normally seating on the stationary valve seat 4, and below the tapered surface 23, at 22, the element 15 is of reduced diameter for a substantial portion of its length, being enlarged at 24 to provide a lowermost enlarged portion terminating in a clamping flange 30, for securing the valve metering element to the lower diaphragm 6. The metering element 15 extends in both its upper and lower portions, by enlarged portions which terminate in larger terminal clamping flanges 30 and 30', clampingly secured to the respective diaphragms.

Though normally, the tapering valve portion 23 is in a position wherein it very nicely seats on the upper circular edge 25 of the orifice 4, when the element 15 is moved upwardly, the tapered valve 23 becomes a metering valve, according to the degree of its upward movement.

Under normal conditions of use, the valve is seldom moved longitudinally more than .040".

Cylindrical webs 40—41 of the casing I surrounding the approach and discharge sides of the valve orifice 25 serve to conduct the flow of fluid towards and from the valve opening, provide baffles in the line of flow, and minimize the likelihood of sediment carried by the fluid proceeding beyond the casing in the direction of the arrow 29, to the carburetor or other engine parts.

In the normal operation of my device, fluid, passing from a source of fluid, such as gasoline or other fuel for an automotive engine, flows to the engine in the direction of the arrow 26, through the coupling 27, inlet port 18, and duct 21. The pressure of fluid in the compartment 3 will exert a pressure on the underside of the diaphragm 7, in excess of fluid pressure in the compartment 2, which exerts an opposing pressure effect on the diaphragm 6, and the metering element 15 will be lifted upwardly by the diaphragm 7 by the excess of pressure in the compartment 3, thereby permitting an increased flow of such liquid fuel through the orifice 4, the rate of such flow depending upon the difference of fluid pressure in the two compartments 3 and 2, respectively, and since normally the pressure of fluid entering at 26 is more nearly constant, the rate of flow will largely depend on the rate of consumption of fuel by the automotive engine to which fuel is supplied through the coupling 28 in the direction of the arrow 29.

Although I have shown the apparatus of the drawing, comprising the metering valve, in a position wherein the inlet chamber is superposed over the discharge chamber, i. e., with the metering pin extending vertically, it will be understood that as a matter of fact commonly this will be placed horizontally, for various reasons, such as the entrapment of air or gas bubbles in contact with the diaphragm, or the deposition of dirt or the like which may be in the gasoline or other fluid on the lower diaphragm, to balance the effect of gravity on the two diaphragms.

Fuel flowing in a more unrestricted manner through the throttle valve of the engine, not shown, the pressure in the pressure compartment 2 will be substantially reduced over the inlet pressure effective in the compartment 3, whereupon the diaphragm 7 will overcome the pressure of fluid on the diaphragm 6 to lift the metering element 15 upwardly, thereby causing an increased opening of the valve, permitting an increased flow of fluid through the orifice 4 to supply the increased demand for fuel by the engine.

However, in such case, the increased rate of flow will commensurately reduce the pressure difference on the two sides of the valve opening 4, as indicated by the degree of elevation of the valve 23.

It is to be noted that at all times, therefore, the metering element 15 will be held in different adjusted positions, longitudinally of the element 15, by the differential effect of pressure exerted on the two diaphragms 7 and 6, and that this adjusted position is responsive to and proportional to the rate of flow of fluid through the orifice 4, and thence to the fuel consuming automotive engine.

Herein, where I have referred to the liquid as fuel or gasoline, and have referred to said fuel as being supplied to an engine, it will be understood that the device will operate in the same manner where other liquids are used and supplied to other devices than automotive engines, the arrangement and proportion of parts herein illustrated being more particularly chosen for application in the fuel line of an automotive engine.

At 12 I show a housing mounted on the uppermost flange 13 of the casting I, said housing serving to enclose electrical controlling means for operating an electrical indicator 50, in a manner to be described.

The electrical controlling mechanism comprises a resilient controlling reed 31 normally lightly resting with spring pressure contact on the upper surface of the cap screw 17 at the center of the diaphragm 7; by virtue of an extension 32 of any suitable material, whereby the reed 31 may be flexed upwardly and downwardly responsive to movements of the metering element 15.

Above the reed 31 I provide a compound reed 37, of preferably the same length, comprising a supporting portion 33 of laminated bi-metallic strip construction, and another portion of the same material, shown at 34, the two strips being secured end to end by a connector 35 of preferably thermal insulating material.

The bi-metallic strips 33 and 34 are formed preferably of the same kind of laminated expansive material, the strip 34 having the most expansive material on the bottom, and the strip 33 having the most expansive material on the top, the strip 33 being provided to compensate for temperature changes of the air within the housing 12.

At 36 I show a pair of electrical contacts carried by the ends of the two reeds. In the operation of my device, the contact elements may be normally slightly separated, or as illustrated, lightly in contact each with the other, and in the latter case completing an electrical circuit herein illustrated as comprising an electrical source of current such as a battery B and a thermally responsive electrical indicator 50, and an electrical heating winding 37 placed about the portion 34 of the compound reed, whereby the portion 34 of the reed is, in operation, intermittently heated by current flowing through said circuit as controlled by the contacts 36, which in operation make and break contact with each other for such part of the time as is commensurable with the degree of elevation of the metering pin 15 as communicated to the lowermost thin controlling reed 31 by the cap screw 17 and element 32. Rapid variations in the rate of flow are therefore subdued in their effect upon the indication of the rate of flow as explained more fully in Patent No. 1,885,049 to Kalle.

The electrical apparatus and circuit illustrated herein for the remote indication of movements or pressure is not per se a part of the present invention, being illustrated and described in prior Letters Patent of the United States, No. 1,885,048, to F. M. Slough, dated October 25, 1932, No. 1,885,049, to T. Kalle, bearing the same date, and No. 1,885,050, to T. J. Smulski, being also of the same date, and to which prior patents reference may be had for a full and complete description of some of the varying alternative forms as may be employed. Nor is my invention limited in all phases to a tele-gauge system for indication, as an indicator hand may be directly applied to the device as shown in the patent to Kalle, or remote indications may be achieved in any other known manner; nor is my invention limited to any particular form of tele-gauge apparatus or electrical circuit, as many forms of apparatus are available for effecting the tele-gauge function, for use in connection with my improved flowmeter.

Having thus described my invention in an embodiment which I at present prefer, I am aware that numerous and extensive departures may be made from the embodiment herein described and illustrated, but without departing from the spirit of my invention and the scope of the appended claims.

I claim:

1. In a rate of flow indicating mechanism, the combination of a casing having liquid flow inlet and outlet ports and a pair of compartments respectively communicating with the said ports, a perforated wall between the compartments, a valve for variably restricting flow from one of said compartments to the other compartment through the wall perforation, each of said compartments also having a resiliently movable wall, said valve interconnecting said walls and effecting simultaneous movements thereof with said valve, in the same direction, commensurably responsive to varying differences in fluid pressure in the two compartments, and indicating means responsive to simultaneous movement of said walls.

2. In a rate of flow indicating mechanism, the combination of a casing having liquid flow inlet and outlet ports and a pair of compartments respectively communicating with the said ports, a perforated wall between the compartments, a valve for variably restricting flow from one of said compartments to the other compartment through the wall perforation, each of said compartments also having a resiliently movable wall, said valve interconnecting said walls and effecting simultaneous movements thereof with said valve, in the same direction, commensurably responsive to varying differences in fluid pressure in the two compartments, indicating means responsive to simultaneous movement of said walls, said indicating means comprising a remotely disposed electro-responsive indicator, a source of current, a current flow varying means secured to said casing, and electrical circuit conductors interconnecting said source of current, indicator, and current flow varying means, said current flow varying means being variably responsive to simultaneous movements of said walls to variably energize said indicator according to the degree of simultaneous displacement of said walls from a datum position.

3. In a rate of flow indicating mechanism, the combination of a casing having liquid flow inlet and outlet ports and a pair of compartments respectively communicating with the said ports, a perforated wall between the compartments, a valve for variably restricting flow from one of said compartments to the other compartment through the wall perforation, each of said compartments also having a resiliently movable wall, said valve interconnecting said walls and effecting simultaneous movements thereof with said valve, in the same direction, commensurably responsive to varying differences in fluid pressure in the two compartments, indicating means responsive to simultaneous movement of said walls, said valve substantially closing said perforation upon substantial equality of fluid pressure in the two compartments.

4. In a rate of flow indicating mechanism, the combination of a casing having liquid flow inlet and outlet ports and a pair of compartments respectively communicating with the said ports, a perforated wall between the compartments, a valve for variably restricting flow from one of said compartments to the other compartment through the wall perforation, each of said compartments also having a resiliently movable wall, said valve interconnecting said walls and effecting simultaneous movements thereof with said valve, in the same direction, commensurably responsive to varying differences in fluid pressure in the two compartments, indicating means including an indicator responsive to simultaneous movement of said walls, said valve substantially closing said perforation upon substantial equality of fluid pressure in the two compartments, and electrical means responsive to varying movements of said valve for causing said indicator to indicate the degree of said valve movements at a point physically removed from said casing.

5. In a rate of flow indicating mechanism, the combination of a casing having liquid flow inlet and outlet ports and a pair of compartments respectively communicating with the said ports, a perforated wall between the compartments, a valve for variably restricting flow from one of said compartments to the other compartment through the wall perforation, each of said compartments also having a resiliently movable wall, said valve interconnecting said walls and effecting simultaneous movements thereof with said valve, in the same direction, commensurably responsive to varying differences in fluid pressure in the two compartments, and indicating means responsive to simultaneous movement of said walls, and baffle means in one compartment at the approach side of said valve.

LEO A. RINGELSTETTER.